US012700131B2

(12) United States Patent　　(10) Patent No.:　US 12,700,131 B2

Jin et al.　　(45) Date of Patent:　　Aug. 4, 2026

(54) METHOD AND APPARATUS FOR LOCALIZATION USING AVPS MARKER

(71) Applicant: HYUNDAI MOBIS CO., LTD., Seoul (KR)

(72) Inventors: Moon Yong Jin, Yongin-si (KR); Jun Ho Choi, Uiwang-si (KR); Ki Chan Kim, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 253 days.

(21) Appl. No.: 18/766,905

(22) Filed: Jul. 9, 2024

(65) Prior Publication Data

US 2025/0200789 A1　　Jun. 19, 2025

(30) Foreign Application Priority Data

Dec. 14, 2023　　(KR) ........................ 10-2023-0181560

(51) Int. Cl.
　　*G06K 9/00*　　　　(2022.01)
　　*G06T 7/73*　　　　(2017.01)
　　　　　　(Continued)

(52) U.S. Cl.
　　CPC ............... *G06T 7/73* (2017.01); *G06V 10/25* (2022.01); *G06V 10/44* (2022.01); *G06V 20/56* (2022.01);
　　　　　　(Continued)

(58) Field of Classification Search
　　CPC . G06T 2207/30264; G06T 2207/30204; G06T 7/73; G06T 2207/20164;
　　　　　　(Continued)

(56) References Cited

U.S. PATENT DOCUMENTS

| | | | | |
|---|---|---|---|---|
| 12,488,497 | B2 * | 12/2025 | Hofmann | ................... G06T 7/85 |
| 2019/0367012 | A1 * | 12/2019 | Matta | .................... G05D 1/0246 |
| 2022/0266867 | A1 * | 8/2022 | Ballard | ............. B60W 60/0025 |

FOREIGN PATENT DOCUMENTS

| | | | | |
|---|---|---|---|---|
| CN | 115239822 A | * 10/2022 | ............. G06V 10/30 |
| DE | 10 2021 112 923 A1 | 11/2022 | |

OTHER PUBLICATIONS

Garrido-Jurado et al., Automatic generation and detection of highly reliable fiducial markers under occlusion, Pattern Recognition 47 (2014) 2280-2292, Computing and Numerical Analysis Department, Córdoba University, Edificio Einstein, 3a planta, Campus de Rabanales, 14071 Córdoba, Spain.

(Continued)

*Primary Examiner* — Gregory A Morse
*Assistant Examiner* — Kevin M Coomber
(74) *Attorney, Agent, or Firm* — Morgan, Lewis & Bockius LLP

(57)　　　　ABSTRACT

The present disclosure provides a method and an apparatus for vehicle localization using AVPS marker.

According to at least one embodiment, the present disclosure provides a method for performing localization by a vehicle including a plurality of cameras, including recognizing corner points of a coded marker from an image acquired from each of the cameras, calculating a position, a width, and an angle of the coded marker by using the coordinates of the corner points, filtering the coded marker, calculating a final weight of the coded marker, generating a position and an angle of a local coded marker, rotationally transforming the position of the local coded marker by using information on markers in a parking facility and the angle of the local coded marker, and measuring the position of the vehicle by using the position of the local coded marker and the final weight.

11 Claims, 4 Drawing Sheets

(51) Int. Cl.
  *G06V 10/25*      (2022.01)
  *G06V 10/44*      (2022.01)
  *G06V 20/56*      (2022.01)

(52) U.S. Cl.
  CPC .............. *G06T 2207/30204* (2013.01); *G06T 2207/30264* (2013.01)

(58) Field of Classification Search
  CPC . G06T 2207/30252; G06T 2207/20024; G06T 5/70; G06T 3/18; G06T 5/80; B62D 15/0285; G01C 21/3685; G01C 21/3602; G06V 20/586; G06V 30/1468; G06V 10/245; G06V 10/25; G06V 10/44; G06V 20/56; G06V 20/54; G06V 10/30; G08G 1/146; B60W 30/06; B60W 2530/18; B60W 2420/403; B60W 60/0025; B60W 40/02; B60W 40/00; B60W 30/08; G06K 7/1443; G05D 1/0234; G05D 1/244
  See application file for complete search history.

(56) References Cited

OTHER PUBLICATIONS

Li et al., ArUco Marker Detection under Occlusion Using Convolutional Neural Network, Auckland University of Technology. Downloaded on Dec. 21, 2020 at 20:22:21 UTC from IEEE Xplore.

Elgendy et al., A Novel Marker Detection System for People with Visual Impairment Using the Improved Tiny-YOLOv3 Model, Computer Methods and Programs in Biomedicine 205 (2021) 106112.

Prasanth Jeevan et al: "Realizing Autonomous Valet Parking with automotive grade sensors", Intelligent Robots and Systems (IROS), 2010 IEEE/RSJ International Conference on, IEEE, Piscataway, NJ, USA, Oct. 18, 2010 (Oct. 18, 2010), pp. 3824-3829, XP031811107.

Extended European Search Report issued on Feb. 21, 2025 in European Patent Application No. 24199687.5.

* cited by examiner

METHOD AND APPARATUS FOR LOCALIZATION USING AVPS MARKER

CROSS-REFERENCE TO RELATED APPLICATIONS

This application claims the benefit of Korean Patent Application Number 10-2023-0181560, filed on Dec. 14, 2023, the entire contents of which are incorporated herein by reference.

TECHNICAL FIELD

The present disclosure relates to a method and apparatus for localization using an AVPS marker, more particularly, to a method and apparatus for improving the accuracy of localization of an autonomous vehicle using an AVPS marker.

BACKGROUND

The statement herein merely provides background information related to the present disclosure and may not necessarily constitute the prior art.

An automated valet parking system (AVPS) is being developed for parking convenience. The AVPS automatically operates a vehicle so that the vehicle moves to an empty parking space and parks when a driver gets off at a drop-off area in a parking facility. Further, the AVPS automatically moves a parked vehicle to a pick-up area upon the driver's request, allowing the driver to board the vehicle.

For safe and reliable AVPS, level 4 or higher autonomous driving is required. The AVPS must not only recognize other objects to prevent collisions, but also determine an empty parking space and a traveling route and automatically move, park, and exit vehicles. To this end, a localization technology for estimating a current position of a subject vehicle is important.

The AVPS adopts vision-based localization using a high definition map and cameras as a localization technology. The AVPS uses a coded marker specified in ISO 23374 for localization. The coded marker is a type of fiducial marker, and may be installed in a parking facility and recognized by a vehicle. The fiducial marker is an artificial marker, an object placed in the field of view of an imaging system that appears in the image produced, for use as a point of reference or a measure. The high definition map may include information on ID, position, orientation, and the like of coded markers installed in a parking facility.

There are issues with the conventional method of detecting and recognizing a coded marker, including the low accuracy of detecting a coded marker due to a distance between the camera and the marker, a distortion of the coded marker in the image, etc., and the difficulty of accurately estimating the distance to the marker. Hence, there is a need for a localization method for accurately estimating the distance between the camera and the marker by taking distortions into account and accurately measuring the position of the vehicle by using the estimated distance.

SUMMARY

Embodiments of the present disclosure provide a method and an apparatus for accurately estimating the distance between a camera and a marker by taking distortions into account and localizing the vehicle based on the estimated distance.

The embodiments of the present disclosure are not limited to the aforementioned embodiments, and other embodiments not mentioned above will be clearly understood by a person having ordinary skill in the art through the following description.

At least one embodiment of the present disclosure provides a method for performing localization by a vehicle including a plurality of cameras, including recognizing corner points of a coded marker from an image acquired from each of the cameras; calculating the coordinates of the corner points, and calculating a position, a width, and an angle of the coded marker by using the coordinates of the corner points; filtering the coded marker based on the position and the width of the coded marker; calculating a final weight of the coded marker; generating a position and an angle of a local coded marker by converting the angle and the position of the coded marker by using the coordinates of one of the cameras as vehicle coordinates; rotationally transforming the position of the local coded marker by using information on markers in a parking facility and the angle of the local coded marker; and measuring the position of the vehicle by using the position of the local coded marker and the final weight.

Another embodiment of the present disclosure provides an apparatus for vehicle localization, including a memory for storing instructions; and at least one processor, wherein, by executing the instructions, the at least one processor recognizes corner points of a coded marker from an image acquired from each of the cameras, calculates the coordinates of the corner points, calculates a position, a width, and an angle of the coded marker by using the coordinates of the corner points, filters the coded marker based on the position and the width of the coded marker, calculates a final weight of the coded marker, generates a position and an angle of a local coded marker by converting the angle and the position of the coded marker by using the coordinates of one of the cameras as vehicle coordinates, rotationally transforms the position of the local coded marker by using information on markers in a parking facility and the angle of the local coded marker, and measures the position of the vehicle by using the position of the local coded marker and the final weight.

According to an embodiment of the present disclosure, it is possible to perform accurate localization by providing a method in which a coded marker is recognized by using a plurality of cameras, a weight is generated by taking into account the distances between the coded marker and the cameras and distortions, and the coded marker recognized by the plurality of cameras is converted into one coordinate system.

The effects of the present disclosure are not limited to the foregoing, and other effects not mentioned herein will be able to be clearly understood by those skilled in the art from the following description.

DETAILED DESCRIPTION

Figure 1:
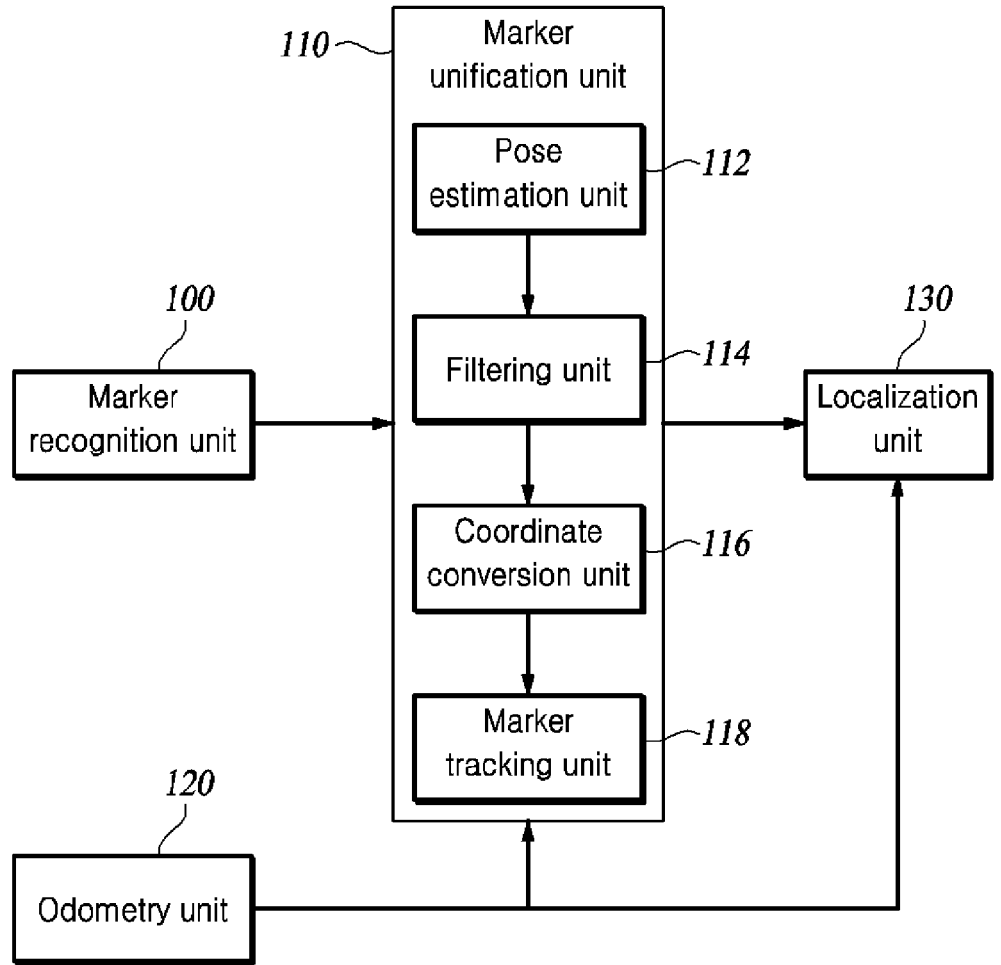
FIG. 1 is a block diagram schematically illustrating a vehicle localization apparatus according to an embodiment of the present disclosure.

Hereinafter, some embodiments of the present disclosure will be described in detail with reference to the accompanying illustrative drawings. In the following description, like reference numerals preferably designate like elements, although the elements are shown in different drawings. Further, in the following description of some embodiments, a detailed description of related known components and functions when considered to obscure the subject matter of embodiments of the present disclosure will be omitted for the purpose of clarity and for brevity.

Various ordinal numbers or alpha codes such as first, second, i), ii), a), b), etc. are prefixed solely to differentiate one component from the other but not to imply or suggest the substances, order, or sequence of the components. Throughout this specification, when a part "includes" or "comprises" a component, the part is meant to further include other components, not to exclude thereof unless specifically stated to the contrary. The terms such as "unit," "module," and the like refer to one or more units for processing at least one function or operation, which may be implemented by hardware, software, or a combination thereof.

The description of embodiments of the present disclosure to be presented below in conjunction with the accompanying drawings is intended to describe exemplary embodiments of the present disclosure and is not intended to represent the only embodiments in which the technical idea of the present disclosure may be practiced.

The present disclosure relates to a technology of improving the accuracy of coded marker detection for vehicle localization in an automated valet parking system (AVPS).

FIG. 1 is a block diagram schematically illustrating a vehicle localization apparatus according to an embodiment of the present disclosure.

Referring to FIG. 1, the vehicle localization apparatus may include all or some of a marker recognition unit 100, a marker unification unit 110, an odometry unit 120, and a localization unit 130.

The marker recognition unit 100 acquires images from a plurality of cameras. For example, the plurality of cameras may be cameras for capturing the front, left, right, and rear of a vehicle, respectively. The marker recognition unit 100 acquires images captured of the front, left, right, and rear of a vehicle, for example, and recognizes a coded marker by using the images. According to an embodiment of the present disclosure, one image may include at least one coded marker.

The marker recognition unit 100 recognizes corner points of a coded marker. One coded marker has four corner points. The marker recognition unit 100 recognizes the ID of the coded marker by using the recognized corner points.

The odometry unit 120 calculates a relative change in the position of a vehicle. The odometry unit 120 acquires the vehicle's specification. The vehicle's specification may include, for example, the wheel base and wheel size of the vehicle. The odometry unit 120 periodically receives driving information of the vehicle. The driving information includes, for example, steering angle and wheel pulse. The odometry unit 120 periodically calculates the odometry of the vehicle using the vehicle's specification and vehicle's driving information. According to an embodiment of the present disclosure, the odometry unit 120 may calculate the odometry of the vehicle whenever it receives driving information. According to an embodiment of the present disclosure, the odometry includes relative longitudinal and lateral distances traveled by the vehicle. The odometry unit 120 periodically stores calculated odometry readings in an odometry buffer.

The odometry unit 120 calculates longitudinal and lateral distances the vehicle has traveled for a period by using the odometry readings stored in the odometry buffer. For example, if fifteen odometry readings are calculated for one second, the odometry unit 120 may periodically calculate the distance traveled for about 66 ms.

The odometry unit 120 measures a latency from a point in time when a camera acquires an image to a point in time when the vehicle performs localization by using a coded marker recognized in that image. The odometry unit 120 calculates the distance the vehicle has traveled for the duration of the latency, i.e., the latency distance, by using odometry.

The marker unification unit 110 may include all or some of a pose estimation unit 112, a filtering unit 114, a coordinate conversion unit 116, and a marker tracking unit 118.

The pose estimation unit 112 estimates the position and angle of each of recognized coded markers. Here, the position of each coded marker is a position relative to the origin on a ground surface vertical to the position of a camera.

Hereinafter, a method in which the pose estimation unit 112 estimates the position and angle of each coded marker will be described with reference to FIGS. 2 and 3. The coordinates in FIGS. 2 and 3 are relative to the origin which is a foot perpendicular from the position of the camera to the ground.

Figure 2:
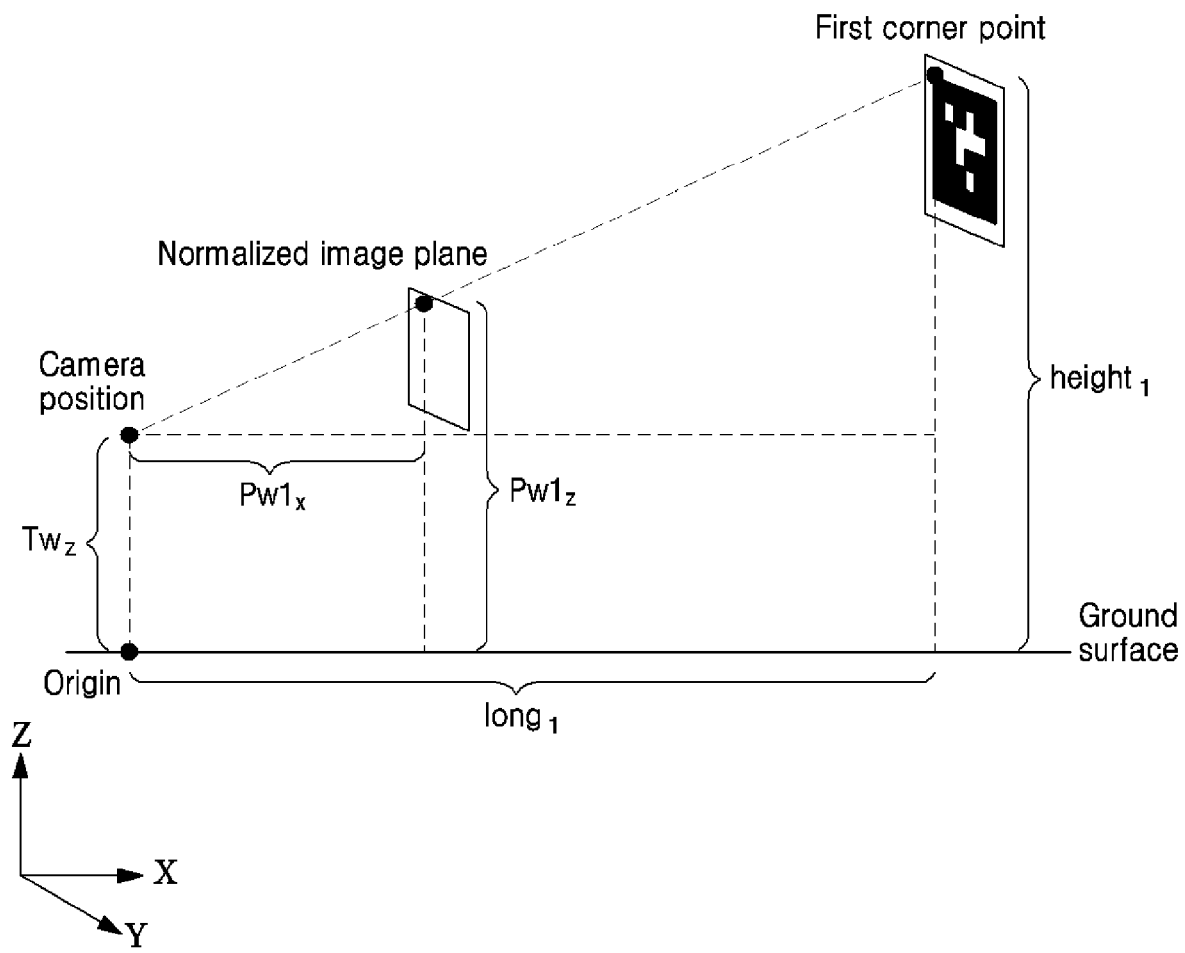
FIG. 2 is a diagram for explaining the calculation of a position of a first corner point of a coded marker according to an embodiment of the present disclosure.
Figure 3:
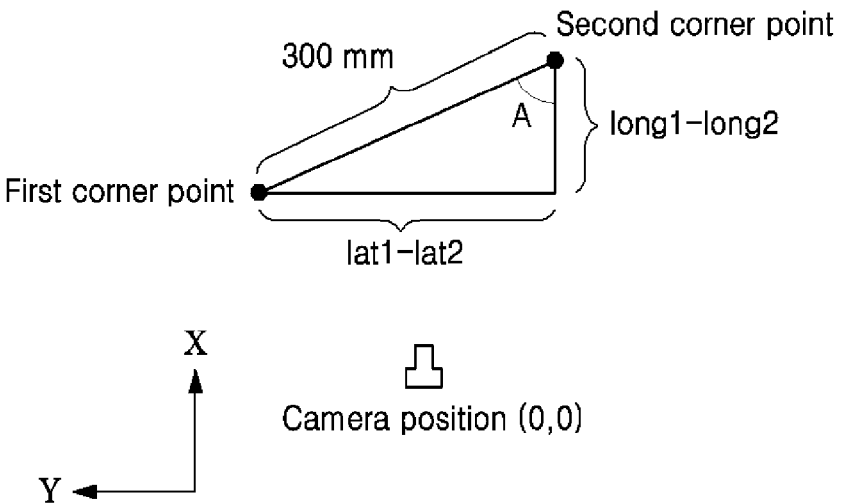
FIG. 3 is a diagram for explaining the calculation of an angle and distance of a coded marker according to an embodiment of the present disclosure.

FIG. 2 is a diagram for explaining the calculation of a position of a first corner point of a coded marker according to an embodiment of the present disclosure.

Referring to FIG. 2, one coded marker has four corner points. The coded marker is square-shaped. According to an embodiment of the present disclosure, a distance between nearest corner points may be 300 mm. The distance between nearest corner points may be calculated from the size of a predefined coded marker.

The pose estimation unit 112 calculates the coordinates of a first corner point of the coded marker by using the distance from the camera to a normalized image plane, the height of the camera from the ground, and the distance between nearest corner points. The first corner point refers to a corner point positioned at a left upper end of the coded marker. The four corner points of one coded marker include a second corner point, a third corner point, and a fourth corner point, placed in a clockwise direction from the first corner point. The normalized image plane is a plane at a predefined distance from the focus of the camera. According to an embodiment of the present disclosure, the normalized image plane may be a plane parallel to the coded marker. The pose estimation unit 112 acquires the coordinates of each corner point on the normalized image plane.

The x coordinate and z coordinate of the first corner point on the normalized image plane are denoted by $Pw1_x$ and $Pw1_z$, respectively. The x coordinate and z coordinate of the fourth corner point on the normalized image plane are denoted by $Pw4_x$ and $Pw4_z$, respectively.

The first and fourth corner points of an actual coded marker have the same x and y coordinates. Let the x coordinate of the first corner point of the actual coded marker be $long_1$ and the z coordinate of the first corner point of the actual coded marker be $\text{height}_1$. Then, the x coordinate of the fourth corner point of the actual coded marker is $\text{long}_1$, and the z coordinate of the fourth corner point of the actual coded marker is $\text{height}_4$. Here, $\text{height}_4$ is a value obtained by subtracting 300 mm from $\text{height}_1$.

The relationship among the height of the camera from the ground $Tw_z$, the coordinates of the first corner point on the normalized image plane, and the coordinates of the first corner point of the actual coded marker is given by Equation 1:

$$\frac{Pw1_x}{Pw1_z - Tw_z} = \frac{\text{long}_1}{\text{height}_1 - Tw_z} \qquad \text{(Equation 1)}$$

where $Tw_z$ is the height of the camera from the ground.

The relationship among the height of the camera, the coordinates of the fourth corner point on the normalized image plane, and the coordinates of the fourth corner point of the actual coded marker is given by Equation 2:

$$\frac{Pw4_x}{Pw4_z - Tw_z} = \frac{\text{long}_1}{\text{height}_1 - 300 - Tw_z} \qquad \text{(Equation 2)}$$

Equation 1 and Equation 2 can be summarized as in Equation 3.

$$\begin{pmatrix} \text{long}_1 \\ \text{height}_1 \end{pmatrix} = \begin{pmatrix} Tw_z - Pw1_z & Pw1_x \\ Tw_z - Pw4 & Pw4_x \end{pmatrix}^{-1} \begin{pmatrix} Tw_z \times Pw1_x \\ (Tw_z + 300) \times Pw4_x \end{pmatrix} \qquad \text{(Equation 3)}$$

The y coordinate of the first corner point and fourth corner point of the coded marker is given by Equation 4:

$$lat_1 = (\text{height}_1 - Tw_z) \times \frac{Pw1_y}{Pw1_z - Tw_z} \qquad \text{(Equation 4)}$$

Since the relationship between the second corner point and the third corner point is the same as the relationship between the first corner point and the fourth corner point, the coordinates of the second corner point may be calculated in the same method as the coordinates of the first corner point. In other words, the coordinates of the first to fourth corner points may be calculated by using Equations 1 to 4.

FIG. 3 is a diagram for explaining the calculation of an angle and distance of a coded marker according to an embodiment of the present disclosure.

Referring to FIG. 3, the distance between the first corner point and the second corner point is 300 mm. The first corner point and the second corner point have the same height, i.e., the same z coordinate.

The angle A of the coded marker can be calculated by Equation 5:

$$A = \tan^{-1}\left(\frac{lat_1 - lat_2}{\text{long}_2 - \text{long}_1}\right) \qquad \text{(Equation 5)}$$

where $lat_1$ is the y coordinate of the first corner point, and $lat_2$ is the y coordinate of the second corner point.

The distance B of the coded marker refers to the distance between the position of the camera and a center point of the coded marker. That is, the distance B of the coded marker can be calculated by Equation 6.

$$B = \sqrt{(\text{long}_c)^2 + (lat_c)^2 + (\text{height}_c - Tw_z)^2} \qquad \text{(Equation 6)}$$

where $\text{long}_c$ is the x coordinate of the center point, late is the y coordinate of the center point, $\text{height}_c$ is the z coordinate of the center point, and the coordinates of the center point of the coded marker can be calculated by using the coordinates of the first to fourth corner points. Hereinafter, the coordinates of the center point of the coded marker will be referred to as the position of the coded marker.

The pose estimation unit 112 may calculate the width of the coded marker. The width of the coded marker may be the distance between the first corner point and the second corner point which is calculated by using the coordinates of the first to second corner points.

According to an embodiment of the present disclosure, the vehicle localization apparatus may include at least one pose estimation unit 112. One pose estimation unit 112 may correspond to one camera. In other words, one pose estimation unit 112 may receive an image from one camera, and calculate the angle, distance, position, and width of a coded marker recognized in the received image.

The filtering unit 114 performs filtering by using the position and width of a recognized coded marker.

The filtering unit 114 deletes recognition information of a coded marker unless the position of the coded marker is present in a region of interest (ROI). The filtering unit 114 deletes recognition information of a coded marker if the width of the coded marker is different from a specific predefined value. In other words, the filtering unit 114 deletes recognition information of a coded marker if the coded marker is present outside an ROI or its width is different from a specific predefined value. The predefined value may be 300 mm, for example.

The filtering unit 114 calculates a weight of a coded marker. The weight of a coded marker includes at least one of a distance weight and a distortion weight. The distance weight is a weight with respect to the distance between a camera and the coded marker. The distortion weight is a weight with respect to the degree of distortion of the coded marker in the image.

The distance weight is a value obtained by dividing the distance between a certain coded marker and a camera by the sum of the distances between all recognized coded marker and the camera. That is, the distance weight is the ratio of the distance of a certain coded marker to the sum of the distances of all recognized coded markers. The greater the distance of the coded marker, the higher the weight. The distance weight of a kth coded marker is calculated by Equation 7:

$$w_{dist}^k = \frac{d_k}{d_1 + d_2 + \ldots + d_n} \qquad \text{(Equation 7)}$$

where n is the number of recognized coded markers, and $d_k$ is a distance between a kth recognized coded marker and a camera.

The filtering unit 114 calculates the distortion weight by using the distance between the corner points of a coded marker and the center point. The distortion weight of a kth coded marker is calculated by Equation 8:

$$w^k_{distrotion} = 1 - \frac{\text{abs}(d^k_{avg} - d^k_1) + \text{abs}(d^k_{avg} - d^k_2) + \text{abs}(d^k_{avg} - d^k_3) + \text{abs}(d^k_{avg} - d^k_4)}{d^k_1 + d^k_2 + d^k_3 + d^k_4} \qquad \text{(Equation 8)}$$

where $d^k_1$ is a distance between a first corner point of a kth recognized coded marker and a center point of the kth recognized coded marker, $d^k_2$ is a distance between a second corner point of the kth recognized coded marker and the center point of the kth recognized coded marker, $d^k_3$ is a distance between a third corner point of the kth recognized coded marker and the center point of the kth recognized coded marker, $d^k_4$ is a distance between a fourth corner point of the kth recognized coded marker and the center point of the kth recognized coded marker, and $d^k_{avg}$ is an average of $d^k_1$, $d^k_2$, $d^k_3$, $d^k_4$.

The filtering unit 114 produces a final weight. The final weight of a kth coded marker is the sum of the distance weight of the kth coded marker and the distortion weight of the kth coded marker.

The filtering unit 114 deletes recognition information on coded markers except the coded marker with the highest final weight, among coded markers having the same ID recognized by different cameras.

The coordinate conversion unit 116 converts the coordinates of coded markers into vehicle coordinates.

The vehicle coordinates may be the coordinates of one of the cameras. For example, the coordinates of a front camera may be determined as the vehicle coordinates, and the coordinates of coded markers recognized by rear, left, and right cameras may be converted into the vehicle coordinates. A camera serving as a reference for the vehicle coordinates is referred to as a reference camera.

The coordinate conversion unit 116 may convert the coordinates of a coded marker by using the position of the coded marker, the angle of the coded marker, and the distances between the cameras. The front, rear, left, and right cameras are placed on the front, rear, left, and right of the vehicle, respectively. The cameras are placed vertically to a neighboring camera. The vertical distance and horizontal distance between the cameras are values included in the specification of the vehicle. The coordinate conversion unit 116 converts the coordinates of a coded marker recognized by each camera by using the angle between each camera and the reference camera and the vertical and horizontal distances between the cameras.

The marker tracking unit 118 predicts the position and angle of a coded marker by using odometry readings from the odometry unit 120 stored in the odometry buffer. The marker tracking unit 118 may periodically predict the position and angle of a coded marker. For example, the marker tracking unit 118 may predict the position and angle of a coded marker on the same cycle as the odometry unit 120. The marker tracking unit 118 produces a predicted position and a predicted angle by predicting the position and angle of a coded marker. The marker tracking unit 118 may produce a predicted position and a predicted angle for every recognized coded marker.

The marker tracking unit 118 associates the position and angle of an actually recognized coded marker with a predicted position and a predicted angle. The marker tracking unit 118 corrects the predicted position and the predicted angle by associating recognized coded marker information such as the position, angle, final weight, and ID with the predicted position and the predicted angle.

The marker tracking unit 118 stores the corrected position and angle of the coded marker, and uses the stored position and angle of the coded marker to produce a predicted position and a predicted angle for the next frame.

The localization unit 130 estimates the global position of the vehicle. The vehicle is in the same global position as the vehicle localization apparatus. The localization unit 130 may receive information on markers in a parking facility from a parking facility control center and estimate the global position by using the information on markers in the parking facility.

The localization unit 130 searches for coded markers with the same ID as a coded marker (hereinafter, "local coded marker") recognized by the vehicle localization apparatus, among coded markers (hereinafter, "global coded markers") included in the information on markers in the parking facility. The localization unit 130 compares the angles of a global coded marker and a local coded marker that have the same ID and calculates the difference. The localization unit 130 performs rotational transformation with respect to the position of the local coded marker by the calculated angle difference.

The localization unit 130 determines whether the rotationally transformed position of the coded marker is within a drivable area. Also, the localization unit 130 determines whether the difference between the position of the rotationally transformed coded marker and the previous position of the vehicle is greater than or equal to a certain predefined value. If the position of the rotationally transformed coded marker is present outside a drivable area or the difference between the position of the rotationally transformed marker and the previous position of the vehicle is greater than or equal to a certain predefined value, the localization unit 130 deletes recognition information on that coded marker.

The localization unit 130 corrects the position of the vehicle by using the vehicle position and odometry for the previous frame, and produces a final vehicle position by adding the latency distance to the corrected position of the vehicle.

Figure 4:
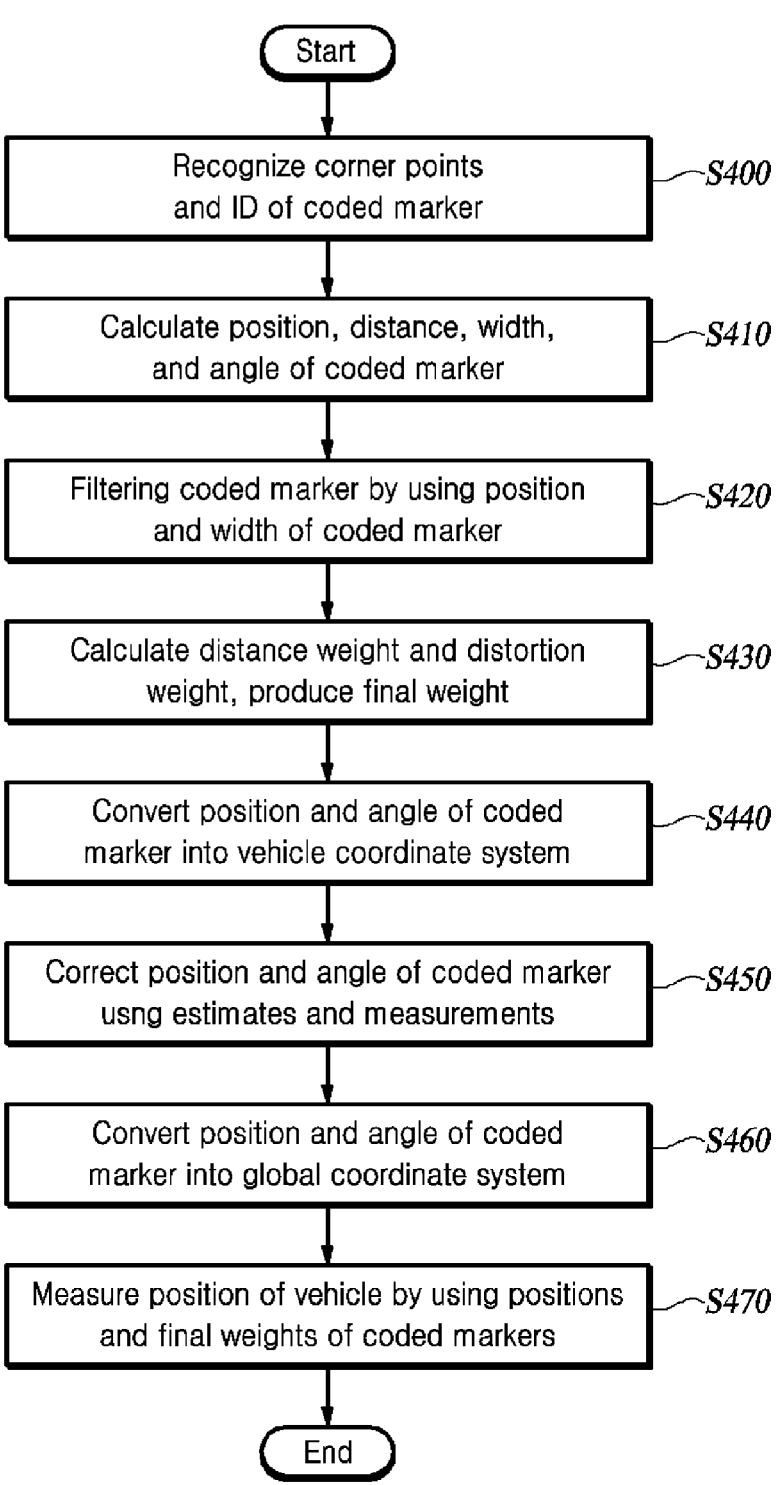
FIG. 4 is a flowchart illustrating a vehicle localization method according to an embodiment of the present disclosure.

FIG. 4 is a flowchart illustrating a vehicle localization method according to an embodiment of the present disclosure.

Referring to FIG. 4, the marker recognition unit 100 acquires an image containing a coded marker from a plurality of cameras. The marker recognition unit 100 recognizes the coded marker in the image. The marker recognition unit 100 recognizes four corner points on each coded marker and the ID of each coded marker (S400).

The pose estimation unit 112 calculates the position, distance, width, and angle of a coded marker by using the coordinates of corner points on a normalized image plane, of the coded marker recognized by the marker recognition unit 100 (S410).

The filtering unit 114 filters recognition information on the coded marker by using the position and width of the coded marker (S420). The filtering unit 114 may filter out recognition information on coded markers that are positioned outside an ROI. The filtering unit 114 may filter out recognition information on coded markers whose width is different from a predefined value. Here, the predefined value may be the size of the coded marker.

The filtering unit 14 calculates a distance weight and a distortion weight for each coded marker, and produces a final weight by adding the distance weight and the distortion weight (S430). The distance weight is a weight with respect to the distance between the coded marker and a camera. The distortion weight is a weight with respect to the degree of distortion of the coded marker in the image.

The coordinate conversion unit 116 determines a reference camera and determines the coordinates of the reference camera as vehicle coordinates. The coordinate conversion unit 116 converts the position and angle of a coded marker acquired from a camera other than the reference camera into the vehicle coordinates (S440). The coordinate conversion unit 116 converts the position and angle of the coded marker into the vehicle coordinates by using the angles between the cameras and the vertical and horizontal distances between the cameras.

The marker tracking unit 118 estimates the position and angle of the coded marker for the next frame by using odometry readings calculated by the odometry unit 120 and the previously acquired position and angle of the coded marker. The marker tracking unit 118 corrects the position and angle of the coded marker by associating the recognized position and angle of the coded marker with the estimated position and angle (S450).

The localization unit 130 converts the position and angle of the coded marker into a position and an angle on a global coordinate system (S460). The localization unit 130 receives information on markers in the parking facility. The localization unit 130 searches the information on markers in the parking facility, for a global coded marker having the same ID as a recognized coded marker, i.e., a local coded marker, and performs rotational transformation with respect to the position of the local coded marker by using the difference in angle between the local coded marker and the global coded marker.

The localization unit 130 measures the current position of the vehicle. The localization unit 130 measures the position of the vehicle by using the positions of a plurality of coded markers and final weights for the coded markers (S470). The localization unit 130 corrects the position of the vehicle by using the position, odometry, and latency distance of the vehicle for the previous frame.

Each component of the device or method according to embodiments of the present disclosure may be implemented in hardware, software, or a combination of the hardware and software. In addition, the function of each component may be implemented as software, and a microprocessor may be implemented to execute the software function corresponding to each component.

Various implementations of the systems and techniques described herein may include digital electronic circuits, integrated circuits, field programmable gate arrays (FPGAs), application specific integrated circuits (ASICs), computer hardware, firmware, software, and/or a combination thereof. These various implementations may include implementations with one or more computer programs executable on a programmable system. The programmable system includes at least one programmable processor (which may be a special purpose processor or a general purpose processor) combined to receive and transmit data and instructions from and to a storage system, at least one input device, and at least one output device. The computer programs (also known as programs, software, software applications, or codes) include instructions for a programmable processor and are stored in a "computer-readable storage medium".

The computer-readable storage medium includes all kinds of storage devices that store data readable by a computer system. The computer-readable storage medium may include a non-volatile or non-transitory medium such as a ROM, CD-ROM, magnetic tape, floppy disk, memory card, hard disk, magneto-optical disk, and storage device, and also further include a transitory medium such as a data transmission medium. Moreover, the computer-readable storage medium may be distributed in computer systems connected through a network, and computer-readable codes may be stored and executed in a distributed manner.

In the flowcharts in the present specification, it is described that each process sequentially occurs, but this is merely an example of the technology of an embodiment of the present disclosure. In other words, a person having ordinary skill in the art to which an embodiment of the present disclosure pertains may make various modifications and variations by changing the orders described in the flowcharts in the present specification or by undergoing one or more of the processes in parallel within the essential characteristics of an embodiment of the present disclosure, so the flowcharts in this specification are not limited to a time-series order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof.

What is claimed is:

1. A method for performing localization by a vehicle including a plurality of cameras, comprising:
   recognizing corner points of a coded marker from an image acquired from each of the plurality of cameras;
   calculating the coordinates of the corner points, and calculating a position, a width, and an angle of the coded marker by using the coordinates of the corner points;
   filtering the coded marker based on the position and the width of the coded marker;
   calculating a final weight of the coded marker;
   generating a position and an angle of a local coded marker by converting the angle and the position of the coded marker by using the coordinates of one of the plurality of cameras as vehicle coordinates;
   rotationally transforming the position of the local coded marker by using information on markers in a parking facility and the angle of the local coded marker; and
   measuring the position of the vehicle by using the position of the local coded marker and the final weight.

2. The method of claim 1, further comprising periodically calculating a relative distance traveled by the vehicle.

3. The method of claim 2, further comprising: predicting the position and angle of a local coded marker for the next frame and producing a prediction result, by using the relative distance traveled by the vehicle and the position and angle of a local coded marker for the previous frame; and
   correcting the position and angle of the local coded marker by associating the prediction result with the position and angle of the local coded marker.

4. The method of claim 1, wherein calculating the final weight of the coded marker includes:
   calculating a distance weight based on the position of the coded marker;

calculating a distortion weight based on a distance between each of the corner points and a center point of the coded marker; and calculating the final weight by adding the distance weight and the distortion weight.

5. The method of claim 1, wherein the coordinates of the corner points are coordinates in a coordinate system in which the origin is a point on a ground surface vertical to each of the plurality of cameras.

6. The method of claim 1, wherein filtering the coded marker includes:

determining whether the position of the coded marker is present outside a region of interest;

in response to a determination that the position of the coded marker is present outside the region of interest, deleting information on the coded marker;

determining whether the width of the coded marker is different from a preset value; and in response to a determination that the width of the coded marker is different from the preset value, deleting information on the coded marker.

7. The method of claim 1, wherein generating the position and the angle of the local coded marker includes deleting information on coded markers except the coded marker with the highest final weight, among coded markers having the same ID.

8. The method of claim 2, wherein measuring the position of the vehicle includes:

correcting the position of the vehicle by using the relative distance traveled.

9. A vehicle localization apparatus comprising:

at least one processor;

a memory storing instructions for execution by the at least one processor, including instructions for:

recognizing corner points of a coded marker from an image acquired from each of a plurality of cameras of a vehicle;

calculating the coordinates of the corner points, and calculating a position, a width, and an angle of the coded marker by using the coordinates of the corner points;

filtering the coded marker based on the position and the width of the coded marker;

calculating a final weight of the coded marker;

generating a position and an angle of a local coded marker by converting the angle and the position of the coded marker by using the coordinates of one of the plurality of cameras as vehicle coordinates;

rotationally transforming the position of the local coded marker by using information on markers in a parking facility and the angle of the local coded marker; and measuring the position of the vehicle by using the position of the local coded marker and the final weight.

10. The vehicle localization apparatus of claim 9, wherein the instructions for execution by the at least one processor includes instructions for: calculating a relative distance traveled by the vehicle.

11. A non-transitory computer-readable medium having instructions for execution by at least one processor, including instructions for:

recognizing corner points of a coded marker from an image acquired from each of a plurality of cameras of a vehicle;

calculating the coordinates of the corner points, and calculating a position, a width, and an angle of the coded marker by using the coordinates of the corner points;

filtering the coded marker based on the position and the width of the coded marker;

calculating a final weight of the coded marker;

generating a position and an angle of a local coded marker by converting the angle and the position of the coded marker by using the coordinates of one of the plurality of cameras as vehicle coordinates;

rotationally transforming the position of the local coded marker by using information on markers in a parking facility and the angle of the local coded marker; and measuring the position of the vehicle by using the position of the local coded marker and the final weight.

* * * * *